(12) United States Patent
Narendra Trivedi et al.

(10) Patent No.: US 10,565,370 B2
(45) Date of Patent: Feb. 18, 2020

(54) SYSTEM AND METHOD FOR ENABLING SECURE MEMORY TRANSACTIONS USING ENCLAVES

(71) Applicant: INTEL CORPORATION, Santa Clara, CA (US)

(72) Inventors: Alpa Narendra Trivedi, Hillsboro, OR (US); Ravi Sahita, Beaverton, OR (US); David Durham, Beaverton, OR (US); Karanvir Grewal, Hillsboro, OR (US); Prashant Dewan, Hillsboro, OR (US); Siddhartha Chhabra, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 440 days.

(21) Appl. No.: 14/998,362

(22) Filed: Dec. 24, 2015

(65) Prior Publication Data

US 2017/0185766 A1 Jun. 29, 2017

(51) Int. Cl.
*G06F 21/53* (2013.01)
*G06F 12/1009* (2016.01)
*G06F 13/28* (2006.01)

(52) U.S. Cl.
CPC .......... *G06F 21/53* (2013.01); *G06F 12/1009* (2013.01); *G06F 13/28* (2013.01); *G06F 2212/251* (2013.01); *G06F 2213/28* (2013.01)

(58) Field of Classification Search
CPC .. G06F 21/53; G06F 21/6218; G06F 12/1081; G06F 12/1009; G06F 9/1081; G06F 2212/152; G06F 2212/1052; G06F 2212/251; G06F 2221/034; G06F 2213/28
See application file for complete search history.

(56) References Cited

U.S. PATENT DOCUMENTS

| | | | |
|---|---|---|---|
| 2012/0159184 A1* | 6/2012 | Johnson | G06F 21/6218 713/189 |
| 2013/0198853 A1* | 8/2013 | McKeen | G06F 21/72 726/26 |
| 2014/0006711 A1* | 1/2014 | Xing | G06F 12/10 711/118 |
| 2014/0089617 A1* | 3/2014 | Polzin | G06F 12/14 711/163 |
| 2015/0186680 A1* | 7/2015 | Johnson | G06F 21/10 713/193 |
| 2015/0188710 A1* | 7/2015 | Johnson | G06F 21/53 713/176 |

OTHER PUBLICATIONS

International Search Report and Written opinion received for PCT Patent Application No. PCT/US2016/063764, dated Mar. 16, 2017, 10 pages.

* cited by examiner

*Primary Examiner* — Khoi V Le

(57) ABSTRACT

Various embodiments are generally directed to an apparatus, method, and other techniques to provide direct-memory access, memory-mapped input-output, and/or other memory transactions between devices designated for use by an enclave and the enclave itself. A secure device address map may be configured to map addresses for the enslave device and the enclave, and a register filter component may grant access to the enclave device to the enclave.

24 Claims, 7 Drawing Sheets

SYSTEM AND METHOD FOR ENABLING SECURE MEMORY TRANSACTIONS USING ENCLAVES

BACKGROUND

A trusted execution environment, referred to herein as an "enclave," protects the execution of trusted computer-program code from potentially malicious other code by executing the trusted code in a secure region of computer memory that is inaccessible to other code—a so-called "inverse sandbox" mechanism. In this approach, rather than attempting to identify and isolate all the malicious code on a system, trusted code may be sealed inside the enclave and protected from attack by the malicious code, irrespective of the privilege level of the latter. The enclave even protects the trusted code from malicious software in a system's operating system or other malicious software having heightened system privileges.

In order to preserve the security of the enclave, communication between the enclave and hardware devices on or connected to the system must be trusted. For example, a device may encrypt data before sending it to the enclave which may then decrypt it; any malicious code would therefore be able to view only encrypted data. This encryption and decryption is, however, both time- and power-consuming and may be the cause of a significant performance and/or battery-life problem on some systems, especially mobile systems.

DETAILED DESCRIPTION

In various embodiments, an enclave memory region and/or access control model includes a region of memory allocated for access by an enclave device. This allocated region of memory may be specific to and exclusive to each device, but any number of devices may be assigned any number of allocated regions of enclave memory. The device may communicate securely with the enclave by writing to and/or reading from the allocated region of memory; the rest of the enclave (e.g., the non-allocated region) may write to or read from the allocated region of memory. Thus the enclave device may communicate with the enclave without overhead associated with, for example, encrypting and decrypting communications. The communications may include direct memory access communications, memory mapped input-output communications, or any other device to memory communications.

In various embodiments, a trusted firmware component identifies a device enclave mode bit assigned to the enclave device that is transmitted with a memory transaction associated with the device. The enclave device may be configured to store the device enclave mode bit in its memory and to transmit the device enclave mode bit with each transaction with the enclave; no specialized hardware or software may be necessary to be installed and/or implemented on the enclave device, and any device may be therefore used as an enclave device. Once the trusted firmware component identifies the device enclave mode bit, it may load an associated secure device address map into a memory translation map disposed between the enclave device and the enclave to map physical addresses, as seen by the enclave device, to enclave device virtual addresses. Any number of enclaves and/or enclave devices may thus be accommodated; when a memory transaction between an enclave and an enclave device is desired, the associated secure device address map is loaded. In some embodiments, the secure device address map is loaded into an input-output memory management unit.

In some embodiments, a register filter component grants access to the enclave device to the enclave device virtual memory. The register filter component may include a base and a device mask; the enclave device is permitted read and/or write access to addresses in the enclave device virtual memory falling between only the base and device mask. Other code, such as operating-system code or application program code, is denied access to the addresses in the enclave device virtual memory falling between the base and device mask.

Figure 1:
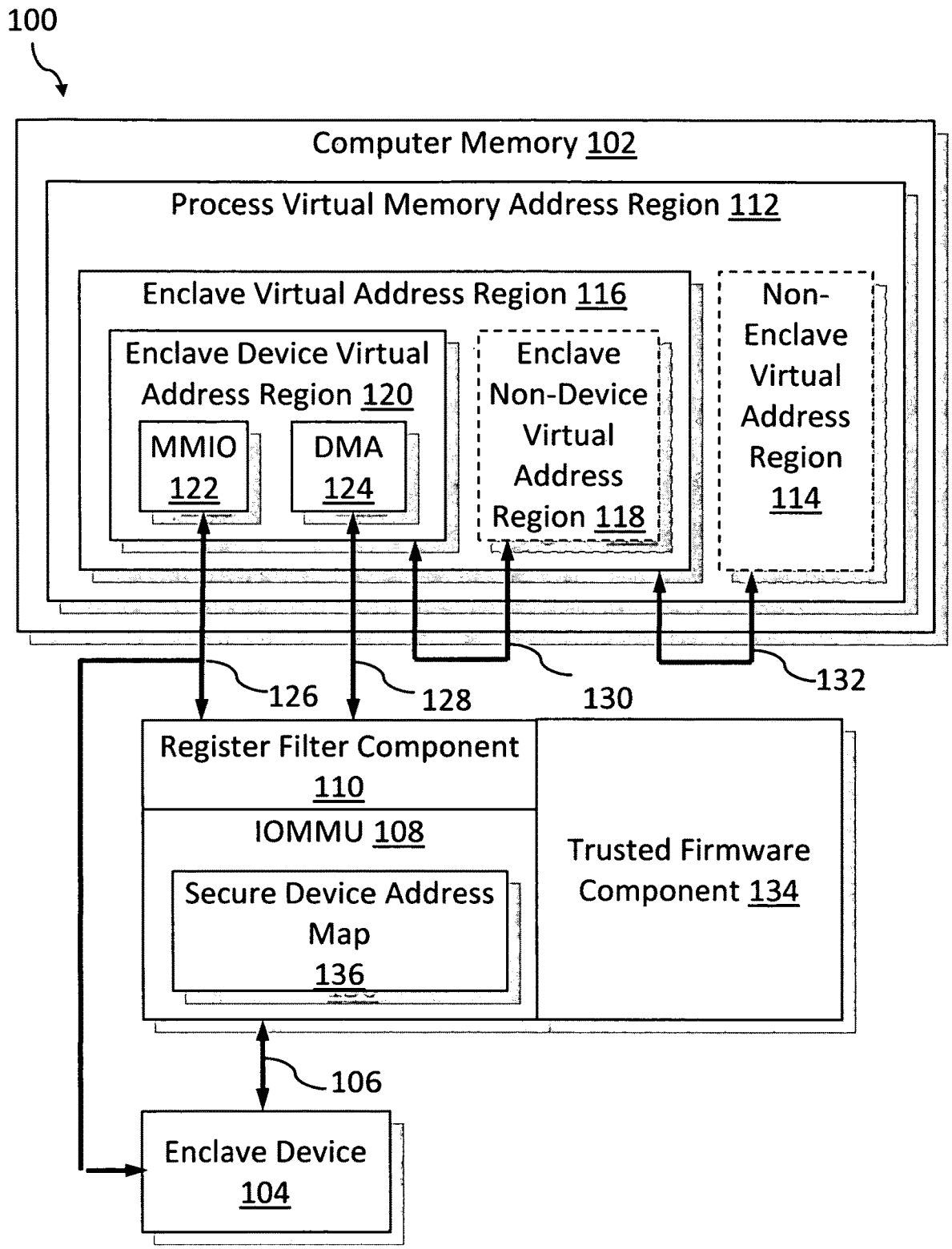
FIG. 1 illustrates an example embodiment of a computing environment.

FIG. 1 illustrates a computing environment 100 that includes a computer memory 102 and an enclave device 104. In various embodiments, the computer memory 102 is volatile memory such as static and/or dynamic random-access memory. An exemplary type of dynamic random-access memory is double-data-rate, fourth generation, synchronous dynamic random-access memory ("DDR4 SDRAM"); any type of static and/or dynamic random-access memory is, however, within the scope of the embodiments described herein. In some embodiments, the computer memory 102 includes, instead of or in addition to volatile memory, non-volatile memory such as a read-only memory, flash memory, phase-change memory, or any other type of non-volatile memory.

The enclave device 104 may be any input/output device, controller, peripheral, transceiver, or any other type of device that communicates with the computer memory 102. Only one enclave device 104 is shown in the computing environment 100, but one of skill in the art will understand that any number of enclave devices 104 may be used. In some embodiments, the enclave device 104 is disposed on the same silicon substrate as the computer memory 102 in a system-on-a-chip configuration; in other embodiments, the enclave device 104 is disposed on a different silicon substrate as the computer memory 102 but in the same chip package as the computer memory 102; in other embodiments, the enclave device 104 is disposed in a different chip package as the computer memory 102 but disposed on the same circuit board and/or in the same housing as the computer memory 102; in still other embodiments, the enclave device 104 is disposed in a different package or housing than the computer memory 102 and communicates therewith via a network connection. Any disposition of the computer memory 102 and enclave device 104 is, however, with the scope of the embodiments described herein.

A link 106 may connect the computer memory 102 and the enclave device 104 and allow electronic communication of data therebetween (via, in some embodiments, an input-output memory management unit ("IOMMU") 108 and/or register filter component 110, as explained in greater detail below). The link 106 may include metal lines in a system-on-a-chip metal stack, traces on a circuit board, package connectors, network links (e.g., a WI-FI or ETHERNET connection), and/or any other type of electrical communication link. The link 106 may include a serial bus, parallel bus, or any other configuration of conductors or signals.

In some embodiments, the computer memory 102 includes a process virtual memory address region 112. As one of skill in the art will understand, a virtual-machine monitor or hypervisor may allocate the process virtual memory address region 112 to a process, program, operating system, or other collection of software instructions executing on a computer system such that the process, program, operating system, or other collection of software instructions may read or write data and/or instructions to the process virtual memory address region 112 as if it were a physical memory exclusive to the process, program, operating system, or other collection of software instructions. The process virtual memory address region 112 may correspond to a contiguous or non-contiguous range of addresses in the computer memory 102. Although only one process virtual memory address region 112 is shown in the environment 100, the computer memory 102 may include any number of additional process virtual memory address regions (associated with a corresponding process, program, operating system, or other collection of software instructions) consistent with the system constraints of the environment 100.

The process virtual memory address region 112 may include virtual addresses; these virtual addresses are shown as a non-enclave virtual address region 114 to distinguish them from an enclave virtual address region 116. The non-enclave virtual address region 114 may include any instructions and/or data associated with its process; the non-enclave virtual address region 114 may not be, however, secure or trusted, and may contain malicious code and/or be vulnerable to malicious code.

The process virtual memory address region 112 may include an enclave virtual address region 116 associated with an enclave, which may also be known as a trusted execution environment. One of skill in the art will understand that the enclave virtual address region 116 may be created, modified, removed, used, or have any other number of operations performed on it or performed using it in accordance with enclave software and/or hardware instructions, such as the SOFTWARE GUARD EXTENSIONS ("SGX") instructions provided by Intel Corporation of Santa Clara, Calif. For example, SGX instructions EENTER and/or EERESUME may be used to enter the enclave virtual address region 116 from the non-enclave virtual address region 114, and SGX instructions EEXIT and/or AEX may be used to leave the enclave virtual address region 116 to the non-enclave virtual address region 114. Any trusted execution environment, is, however, within the scope of the embodiments described herein, and the embodiments are not limited to only SGX instructions.

The enclave virtual memory address region 116 may include an enclave non-device virtual address region 118 for storing instructions and/or data associated with code in the enclave. In addition, in accordance with embodiments described herein, the enclave virtual memory address region 116 may further include an enclave device virtual address region 120 for communicating with the device 104. As explained in greater detail below, the enclave device virtual address region 120 may include a memory mapped input output ("MMIO") region 122 and/or a direct-memory access ("DMA") region 124.

The enclave device 104 may communicate with the computer memory using an MMIO link 126 and/or using a DMA link 128 (via the IOMMU 108 and/or register filter component 110). The enclave non-device virtual address region 118 may communicate with the enclave device virtual address region using in-enclave memory operations 130, which may include raising interrupts. For example, the enclave device may transfer data to the enclave device virtual address region 120 using the MMIO link 126 and/or the DMA link 128; once transferred, code in the enclave non-device virtual address region 118 may access the transferred data using one or more in-enclave memory operations 130. The MMIO link 126 and/or the DMA link 128 may correspond to physical wires, routes, busses, or similar electrical conductors; the in-enclave memory operations 130 may correspond to data moving in accordance with software instructions. In some embodiments, the enclave is entered or exited using enter or exit instructions 132.

As described in greater detail below, a trusted firmware component 134 may identify a device enclave mode bit in communications to or from the enclave device 104 (using, e.g., the link 106, MMIO link 126, or any other input or output link to or from the enclave device 104). If the device enclave mode bit is detected, the trusted firmware component may configure a secure device address map 136 in the IOMMU 108 to map addresses for that particular enclave device 104. The secure device address map 136 for the enclave device 104 may be stored in the enclave virtual address region 116, as may the device mode enable bit.

Figure 2A:
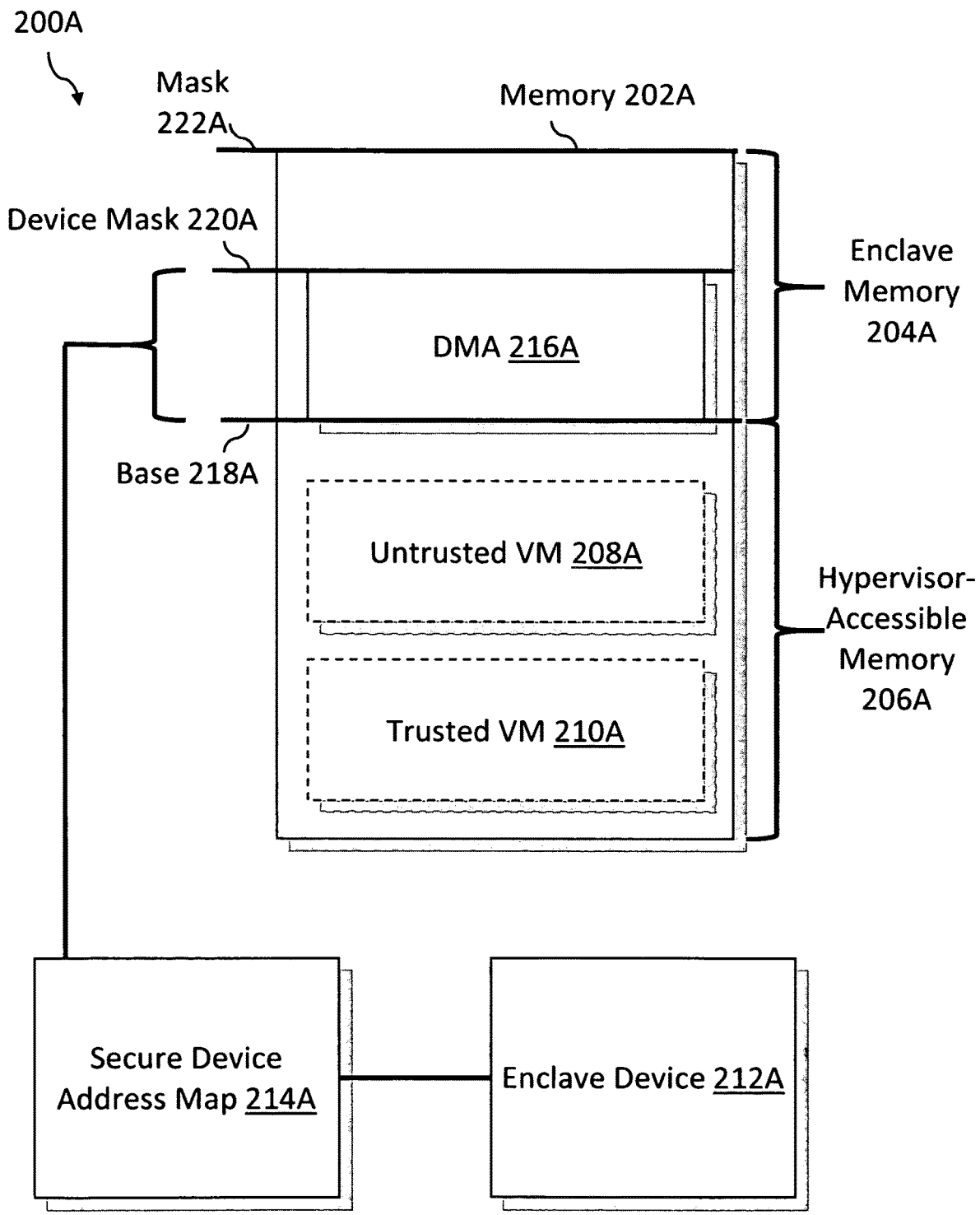
FIGS. 2A and 2B illustrate example embodiments of a computer memory.
Figure 2B:
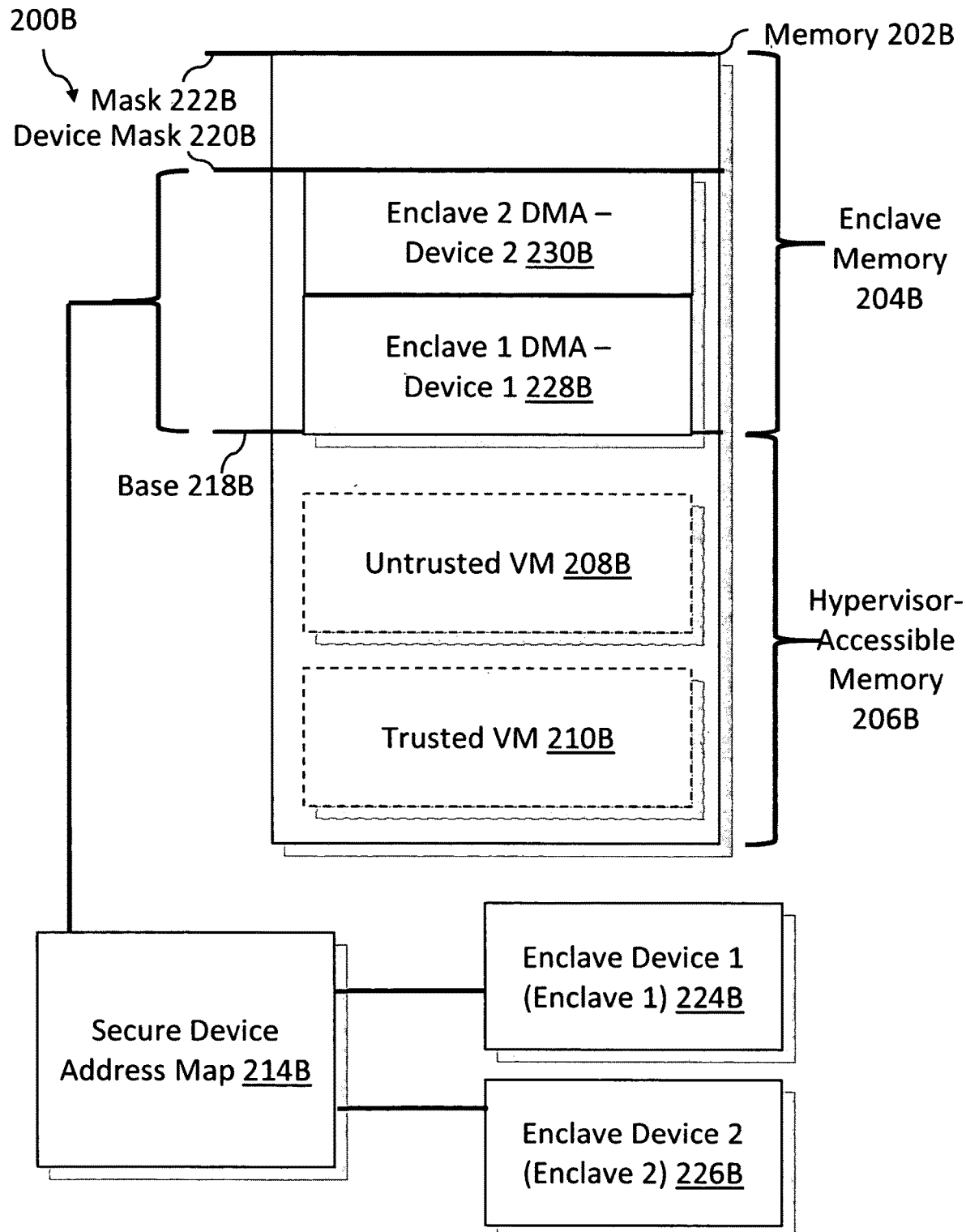

FIGS. 2A and 2B illustrate exemplary memories 200A, 200B, respectively, in accordance with embodiments described herein. Turning first to FIG. 2A, the memory 202A includes a first section of enclave memory 204A and a second section of hypervisor-accessible memory 206A (i.e., non-enclave memory). Any computer code, software, programs, or data may be stored in or execute from the hypervisor-accessible memory 206A, such as an untrusted virtual machine 208A, a trusted virtual machine 210A, or any other virtual machine, operating system, or other such construct.

In various embodiments, an enclave device 212A communicates with the enclave memory 204A. A secure device address map 214A maps physical addresses to and from enclave virtual addresses in a DMA region 216A in the enclave memory 204A. In some embodiments, the secure device address map 214A is part of an input-output memory management unit; in other embodiments, the secure device address map 214A resides in trusted firmware, processor microcode, and/or in hardware. One of skill in the art will understand, however, that any system or method of DMA mapping is within the scope of the present invention. The secure device address map 214A may include a look-up table that pairs physical addresses with enclave virtual addresses and that outputs a physical address given an enclave virtual address (and vice versa); the secure device address map 214A may instead or in addition calculate a physical address and/or enclave virtual address given one or the other by, for example, adding an offset to the given address. Any implementation of the secure device address map 214A is, however, within the scope of the embodiments described herein.

In some embodiments, a base 218, device mask 220, and/or mask 222 values may be used to grant access for the enclave device 212A to the DMA region 216A. These values 218A, 220A, 222A may be stored in a register, such as the register filter 108 of FIG. 1, or in any other register or memory. In some embodiments, a memory transaction associated with the enclave device 212A, such as a DMA read or write, is permitted only if a memory address associated with the transaction falls within the range defined by the base 218A and device mask 220A, thus blocking the enclave device 212A from accessing other portions of the enclave memory 204A.

FIG. 2B illustrates the memory 200B in accordance with embodiments described herein. Like the memory 200A of FIG. 2A, the memory 200B includes an enclave memory 204B, a hypervisor-accessible memory 206B (containing an untrusted virtual machine 208B, a trusted virtual machine 210B, and/or any other such constructs), s secure device address map 214B, and base 218B, device mask 220B, and mask 222B values. In this embodiment, however, there are two enclave devices: a first enclave device 224B and a second enclave device 226B. Within the enclave memory 204B, a first enclave DMA region 228B associated with a first enclave is assigned to the first enclave device 224B, and a second enclave DMA region 230 associated with a second enclave is assigned to the second enclave device 226B. In other words, different enclaves may communicate independently with different enclave devices; this communication may be exclusive (i.e., the first enclave device 224B may not be permitted to communicate with the second enclave DMA region 230), or multiple enclaves may share the same enclave device(s). As explained in greater detail below, the secure device address map 214B may be configured when an enclave is active to map any enclave devices assigned to that enclave to an assigned enclave DMA region.

Figure 3:
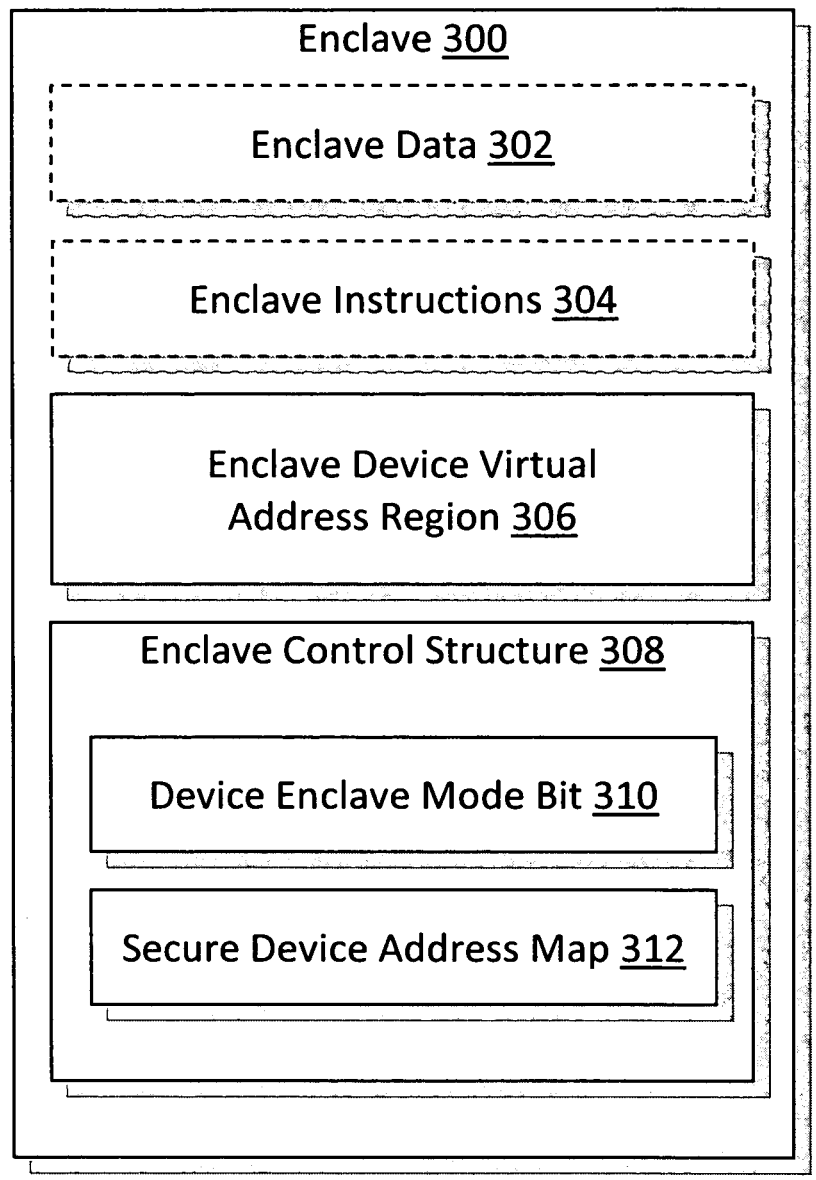
FIG. 3 illustrates an example embodiment of an enclave.

FIG. 3 illustrates an exemplary enclave 300 in accordance with embodiments described herein. As mentioned above, the enclave 300 may include enclave data 302 and/or enclave instructions 304 in accordance with enclave operations and functions. As also mentioned above, the enclave 300 may include an enclave device virtual address region 306 for communicating with enclave devices. In addition, in some embodiments, the enclave 300 includes an enclave control structure 308; the enclave control structure 308 may be the SGX enclave control structure ("SECS") associated with SGX enclaves, but the embodiments disclosed herein are not limited to any particular implementation of the enclave control structure 308. The enclave control structure 308 may contain data and/or metadata associated with the setup, configuration, and/or status of the enclave 300. In some embodiments, the enclave control structure 308 is a memory page in the enclave 300; in other embodiments, the enclave control structure 308 is stored in another memory, in firmware, or in any other similar storage.

In some embodiments, the enclave control structure 308 includes a device enclave mode bit 310. The device enclave mode bit 310 may be one or more binary digits that signify that an enclave device is in communication with the enclave 300; in some embodiments, the device enclave mode bit 310 identifies the enclave device to the enclave 300. In other embodiments, any other bits may be used to identify the enclave device, such as a machine-access code. For example, if the device enclave mode bit 310 is zero, the enclave 300 is not in communication with an enclave device, and if the device enclave mode bit 310 is one, the enclave 300 is in communication with an enclave device. In other embodiments, if the device enclave mode bit 310 is non-zero and contains multiple bits, the bits may identify a particular device as the enclave device.

The enclave control structure 308 may further include a secure device address map 312. As mentioned above, the secure device address map 312 may be used to map physical addresses to enclave device virtual addresses. In some embodiments, as described in more detail below, a component such as the trusted firmware component 134 of FIG. 1 may load the map from the secure device address map 312 and store it in the IOMMU 108 for a particular enclave device and enclave.

Figure 4:
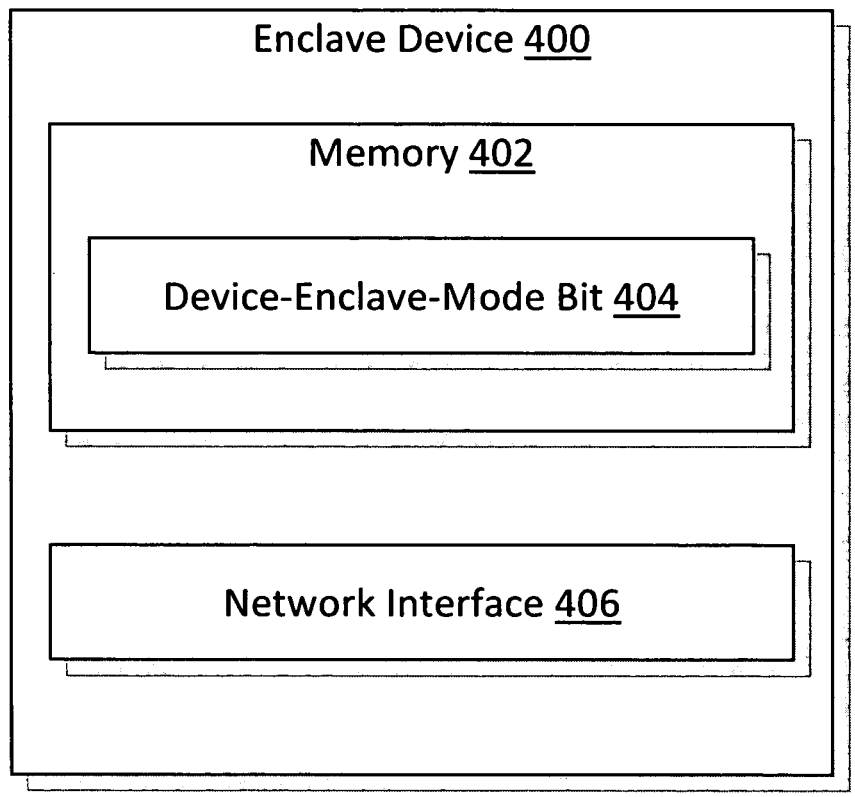
FIG. 4 illustrates an example embodiment of an enclave device.

FIG. 4 illustrates an enclave device 400. The enclave device 400 may include a memory 402 for storing that enclave device's device mode enable bit 300 as received from, for example, the trusted firmware component 134 of FIG. 1. The enclave device 400 may further include a network interface 406 for communicating with an enclave. The enclave device may include any other component or system, such as a processor, non-volatile storage, keyboard, display, touchscreen, bus controller, or any other such component; one of skill in the art will understand that the embodiments disclosed herein are not limited to any particular device 400.

Figure 5:
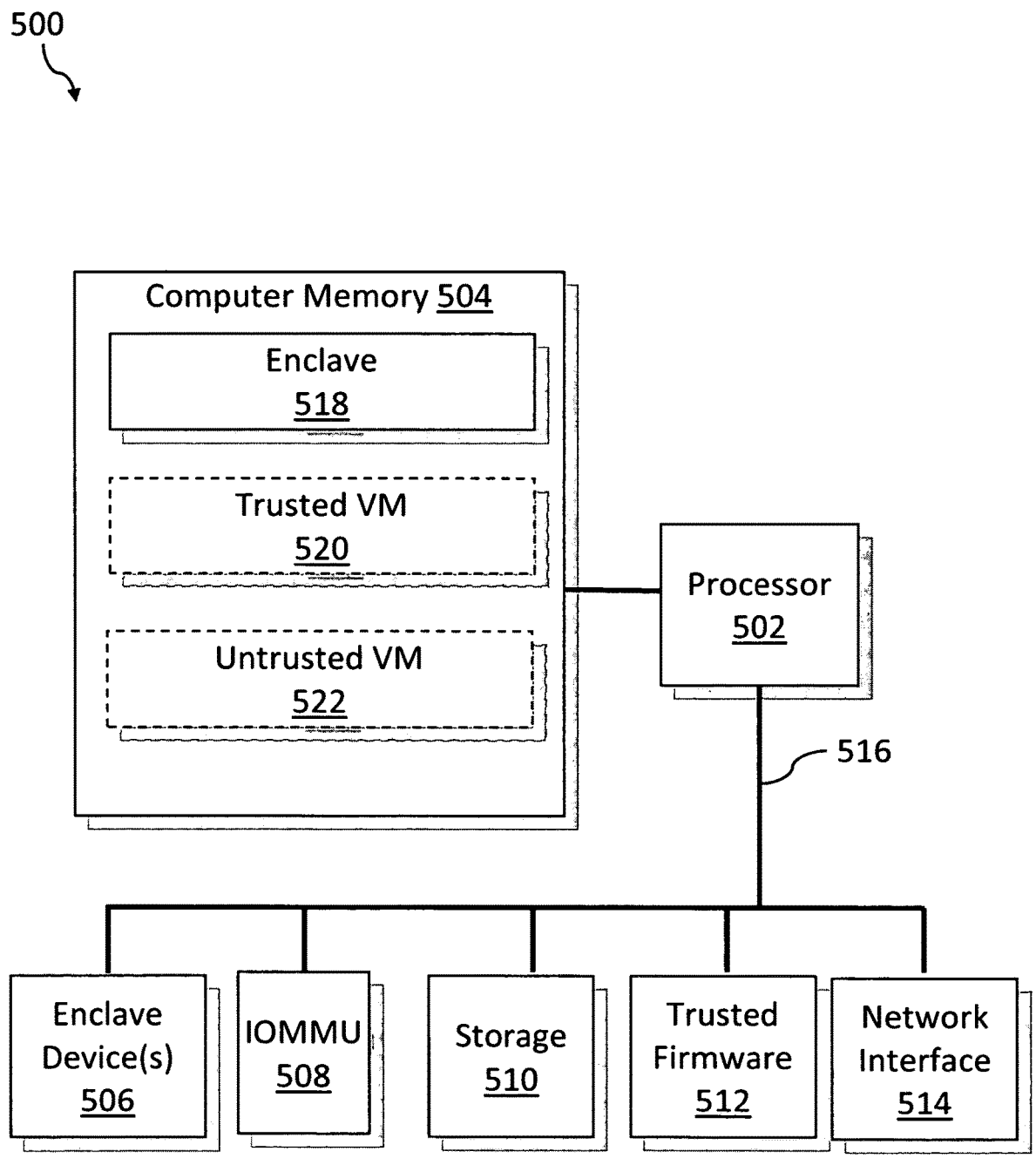
FIG. 5 illustrates an example embodiment of a computing system.

FIG. 5 illustrates a computing device 500 in accordance with embodiments described herein. The computing device 500 may include a processor 502, a computer memory 504 (i.e., volatile storage), one or more enclave devices 506, an IOMMU 508, storage 510 (i.e., non-volatile storage), trusted firmware 512, a network interface 514, and any other components or features, which may communicate via a link 516. The processor 502 may be any type of processing circuit such as a central-processing unit, digital-signal processor, application-specific integrated circuit, or similar processor, and may include one or units, cores, or co-processors, some or all of which may operate in a low-power mode. The computer memory 504 may be random-access memory such as DDR memory, read-only memory, or any other type of memory. The enclave device(s) 506 may include a keyboard, mouse, touchscreen, microphone, LCD monitor, disk controller, bus controller, touchscreen, speaker, vibration generator or any other similar input and/or output device. The IOMMU 508 may be hardware, software, and/or firmware and may be implemented as a stand-alone device, as part of the processor 502, as part of the trusted firmware 512, or as any other implementation. The storage 510 may be any magnetic hard disk drive, solid-state hard disk drive, flash memory, or similar non-volatile storage or removable media such as a CD, DVD, or USB flash drive. The trusted firmware 512 may be implemented as a stand-alone device, as part of the processor 502, as part of the IOMMU 508, or as any other implementation. The network interface 214 may include a cellular transceiver, a WI-FI transceiver, a BLUETOOTH transceiver, an ETHERNET transceiver, or any other similar network interface. The link 216 may be any system bus, interconnect, network link, or similar link, and may include the DMA and/or MMIO links described above.

The computer memory 504 may be used to store instructions to be executed by the processor 502. These instructions may be part of an enclave 518, part of a trusted virtual machine 520, part of an untrusted virtual machine 522, or any other instructions. The instructions may include an operating system (e.g., a Microsoft WINDOWS, Linux, ANDROID, APPLE IOS, or APPLE OS X operating system) that directs the execution of low-level, basic system functions (such as memory allocation, file management, and the operation of mass storage devices), as well as higher-level application routines. The instructions may include any suitable programming language, including, without limitation high-level languages such as C, C++, Java, Perl, Python, or Ruby or low-level assembly languages. The computer memory 504 may further store input and/or output data associated with execution of the instructions as well as additional information used by the various application routines.

Figure 6:
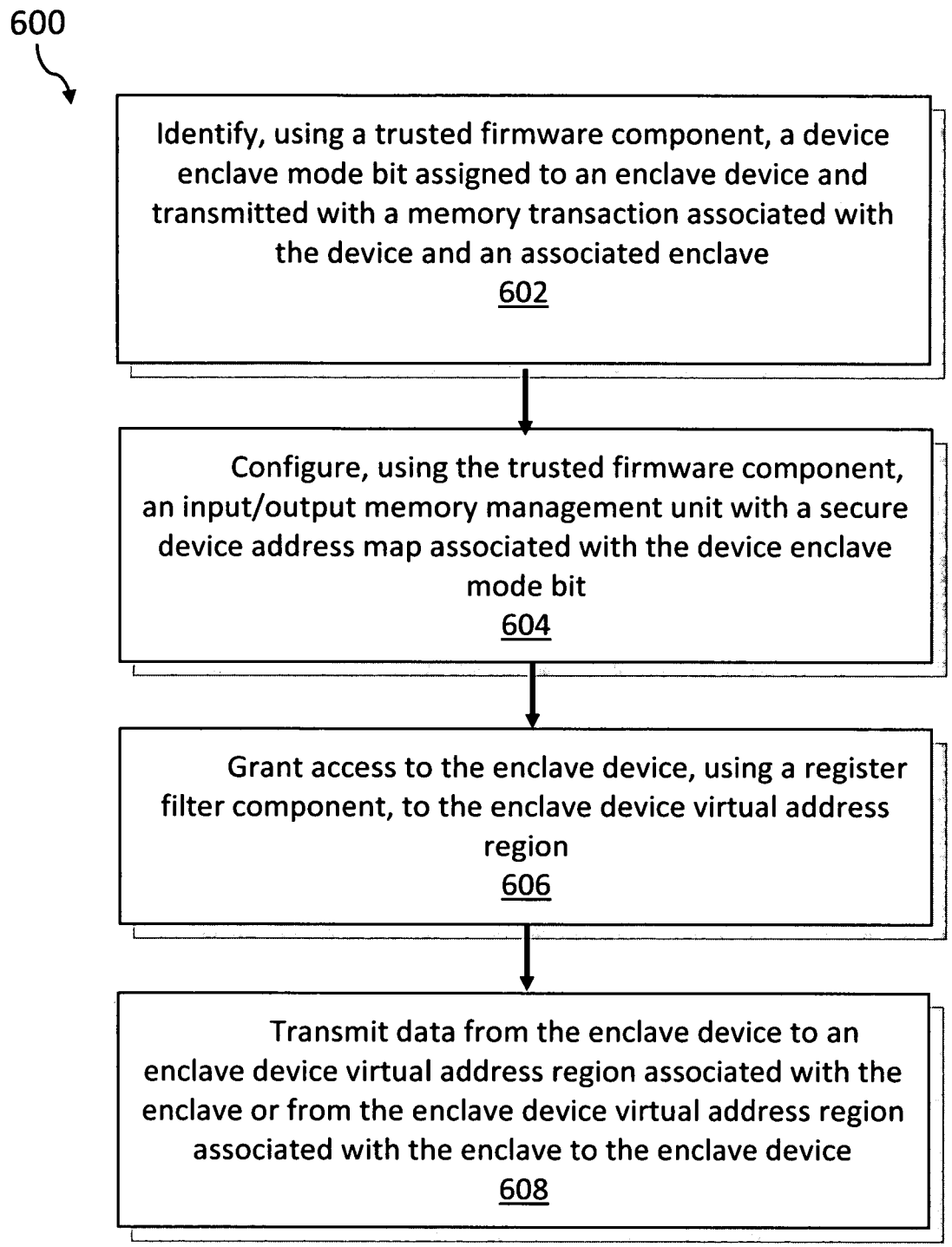
FIG. 6 illustrates a flow diagram.

FIG. 6 illustrates a flow diagram 600 in accordance with embodiments disclosed herein. A device enclave mode bit, such as the device enclave mode bit 310 of FIG. 3, assigned to an enclave device, such as the enclave device 104 of FIG. 1, is identified (602), using a trusted firmware component such as the trusted firmware component 134 of FIG. 1, and transmitted with a memory transaction associated with the enclave device 104 and an associated enclave, such as the enclave 300 of FIG. 3. An input/output memory management unit, such as the input/output memory management unit 108 of FIG. 1, is configured (604), using the trusted software component 134, with a secure device address map, such as the secure device address map 136 of FIG. 1, associated with the device enclave mode bit 310. Access to the enclave device is granted (606), using a register filter component, to the enclave device virtual address region. Data is transmitted (608) from the enclave device to an enclave device virtual address region associated with the enclave or from the enclave device virtual address region associated with the enclave to the enclave device.

The following paragraphs describe one system and method that implements the embodiments described herein with particular reference to SGX instructions. One of skill in the art will understand, however, that this implementation is not limiting and that the embodiments described herein may be implemented on any system using any instruction set.

One SGX instruction, EADD, commits virtual memory pages within a process virtual memory address region 112 to the enclave virtual address region 120. In some embodiments, the EADD instruction is extended to create the device MMIO region 122 and/or the device DMA region 124. In these embodiments, EADD (which may be given the argument ENCLS[EAX=01 h]) assigns the device MMIO region 122 from the enclave virtual address region 116, from the non-enclave virtual address region 114, or from any other OS-accessible region into the enclave virtual address region 116, associates the device MMIO region 122 with an enclave control structure 308, and/or stores security attributes, such as an associated device enclave mode bit 310, in the enclave control structure 308, in an enclave page cache map, or in any other location. As part of the association, the security attributes may be measured and extended into a field that stores and maintains enclave metadata and other attributes, such as SECS.MRENCLAVE. In some embodiments, the EADD instruction may only be executed when a current privilege level is set to a heightened or restricted level, such as level 0. General process registers may be used to store information related to the committed virtual memory pages; for example, an RBX register may be configured to contain the effective address of a PAGEINFO structure, while an RCX register may be configured to contain the effective address of an enclave page cache page.

In some embodiments, the enclave virtual address region 116'includes a plurality of different page types, such as a PT_SECS page type that is configured to store an enclave control structure 308. The number and type of page types may be extended in accordance with embodiment disclosed herein. For example, a PT_DEV page type may be defined to store a device MMIO region 122. In some embodiments, the device MMIO region 122 may correspond to physical memory that corresponds to the enclave device configuration space. An enclave device 104 may be configured to accept configuration input-output accesses from only an associated enclave via use of the device enclave mode bit 310.

In some embodiments, the enclave virtual address region 116 instead or in addition includes a PT_DMA page type: for a device DMA region 124. Different types of DMA regions 124, such as read-only or read-write types, may be created using the existing permissions bits in the PAGEINFO.S-ECINFO field, such as read (R), write (W), and/or execute (X) permission bits.

The SGX instructions, in this example, further include EENTER/ERESUME and EEXIT/AEX instructions to transition 132 between an enclave virtual address region 116 and a non-enclave virtual address region 114. These instructions may be used to transition into and out of an enclave execution context for an enclave that has device access (configured, for example, via a license/capability granted to the enclave or for specific types of architectural enclaves). In various embodiments, these instructions are extended to context switch two additional fields in the enclave-control structure for the enclave: the device-enclave-mode bit 310 on the logical processor that is in enclave mode of operation and the secure device address map 312. In various embodiments, the processor 502 and/or microcode executing thereon is responsible for sending this context switch to the IOMMU 108 (and/or other system-on-a-chip fabric logic) to load the secure device address map 312 into the IOMMU 108 if required. In some embodiments, an input-output translation-lookaside buffer is flushed during this operation.

The enclave device 104 may signal activities/events to the enclave 300 by using an enclave specific interrupt remapping table which may be used to assign specific interrupts to specific enclaves. When the enclave device 104 is configured to be in secure mode (i.e., it issues device input/output cycles with the device enclave mode bit 310 set), interrupts sent to an enclave 300 may not be receivable by the enclave 300 (due to, for example, it being scheduled out). For such operations, the enclave device 104 may post an interrupt event to the enclave MMIO region 122, which may then be delivered to the enclave 300 when it is scheduled and an ERESUME is executed. The processor 502 may deliver the information of the device event to the enclave virtual address region 116 via a posted interrupt descriptor, and a notification event flag may be set when the ERESUME successfully transitions control to the enclave 300. In response, the device enclave code may perform normal memory operations to the device MMIO region 122 to acknowledge the posted interrupt.

Example 1 is an apparatus for secure enclave device memory access comprising a computer processor; an enclave disposed in a computer memory to execute trusted computer instructions using the computer processor and comprising an enclave device virtual address region; an input/output memory management unit to map a memory address from a physical address to an enclave device virtual address in the enclave device virtual address region; a register filter component to grant an enclave device access to the enclave device virtual address region; a trusted firmware component to identify a device enclave mode bit assigned to the enclave device and transmitted with a memory transaction associated with the enclave device and to configure the input/output memory management unit with a secure device address map associated with the device enclave mode bit.

Example 2 includes the subject matter of example 1, where the register filter component comprises a base register and a device mask register.

Example 3 includes the subject matter of example 2, where the base register is further configured for storing a base memory address of the enclave and the device mask register is configured for storing a size of the enclave device virtual address region.

Example 4 includes the subject matter of example 1, where the enclave further comprises an enclave non-device virtual address region in communication with the enclave device virtual address region.

Example 5 includes the subject matter of example 1, where the secure device address map is stored in an enclave control structure associated with the enclave.

Example 6 includes the subject matter of example 1, where the memory transaction comprises a direct-memory access transaction or a memory-mapped input-output transaction.

Example 7 includes the subject matter of example 1, where the trusted firmware component configures the input/output memory management unit with the secure device address map using a software-guard extension instruction.

Example 8 includes the subject matter of example 7, where the software-guard extension instruction comprises an EENTER, EERESUME, EEXIT, or AEX instruction.

Example 9 includes the subject matter of example 1, where the computer memory comprises volatile or non-volatile memory.

Example 10 includes the subject matter of example 1, further comprising a plurality of enclave devices.

Example 11 includes the subject matter of example 1, where the enclave device is disposed on a same silicon substrate as the computer memory.

Example 12 includes the subject matter of example 1, further comprising a link between the computer memory and the enclave device.

Example 13 includes the subject matter of example 12, where the link comprises a system-on-a-chip metal stack, a trace on a circuit board, a package connector, or a network link.

Example 14 includes the subject matter of example 1, where the secure device address map comprises a look-up table.

Example 15 is a computer-implemented method for secure enclave device memory access comprising identifying, using a trusted firmware component, a device enclave mode bit assigned to an enclave device and transmitted with a memory transaction associated with the enclave device and an associated enclave; configuring, using the trusted firmware component, an input/output memory management unit with a secure device address map associated with the device enclave mode bit; granting access to the enclave device, using a register filter component, to the enclave device virtual address region; and transmitting data from the enclave device to an enclave device virtual address region associated with the enclave or from the enclave device virtual address region associated with the enclave to the enclave device.

Example 16 includes the subject matter of example 15, where the register filter component grants access to the enclave device using a base register and a device mask register.

Example 17 includes the subject matter of example 15, where the base register stores a base memory address of the enclave and the device mask register is configured for storing a size of the enclave device virtual address region.

Example 18 includes the subject matter of example 15, where the enclave device virtual address region communicates with an enclave non-device virtual address region.

Example 19 includes the subject matter of example 15, further comprising storing the secure device address map in an enclave control structure associated with the enclave.

Example 20 includes the subject matter of example 15, where the memory transaction comprises a direct-memory access transaction or a memory-mapped input-output transaction.

Example 21 includes the subject matter of example 15, further comprising configuring, using the trusted firmware component, the input/output memory management unit with the secure device address map using a software-guard extension instruction.

Example 22 includes the subject matter of example 21, where the software-guard extension instruction comprises an EENTER, EERESUME, EEXIT, or AEX instruction.

Example 23 includes the subject matter of example 15, where the enclave residing in a computer memory comprises volatile or non-volatile memory.

Example 24 includes the subject matter of example 15, further comprising identifying a plurality of device enclave mode bits assigned to a plurality of enclave devices.

Example 25 includes the subject matter of example 15, where the enclave device is disposed on a same silicon substrate as the computer memory.

Example 26 includes the subject matter of example 15, further comprising linking between the computer memory and the enclave device.

Example 27 includes the subject matter of example 26, where the linking comprises a system-on-a-chip metal stack linking, a tracing on a circuit board, a package connecting, or a network linking.

Example 28 includes the subject matter of example 15, where the secure device address map comprises a look-up table.

Example is a tangible machine-readable storage medium comprising instructions that, when executed by a processing device, cause the processing device to: identify, using a trusted firmware component, a device enclave mode bit assigned to an enclave device and transmitted with a memory transaction associated with the enclave device and an associated enclave; configure, using the trusted software component, an input/output memory management unit with a secure device address map associated with the device enclave mode bit; grant access to the enclave device, using a register filter component, to the enclave device virtual address region; and transmit data from the enclave device to an enclave device virtual address region associated with the enclave or from the enclave device virtual address region associated with the enclave to the enclave device.

Example 30 includes the subject matter of example 29, where the register filter component is configured to grant access to the enclave device using a base register and a device mask register.

Example 31 includes the subject matter of example 29, where the base register is configured to store a base memory address of the enclave and the device mask register is configured for storing a size of the enclave device virtual address region.

Example 32 includes the subject matter of example 29, where the enclave device virtual address region is configured to communicate with an enclave non-device virtual address region.

Example 33 includes the subject matter of example 29, where the instructions further cause the processing device to store the secure device address map in an enclave control structure associated with the enclave.

Example 34 includes the subject matter of example 29, where the memory transaction comprises a direct-memory access transaction or a memory-mapped input-output transaction.

Example 35 includes the subject matter of example 29, where the instructions further cause the processing device to configure, using: the trusted firmware component, the input/output memory management unit with the secure device address map using a software-guard extension instruction.

Example 36 includes the subject matter of example 35, where the software-guard extension instruction comprises an EENTER, EERESUME, EEXIT, or AEX instruction.

Example 37 includes the subject matter of example 29, where the enclave residing in a computer memory comprises volatile or non-volatile memory.

Example 38 includes the subject matter of example 29, further comprising identifying a plurality of device enclave mode bits assigned to a plurality of enclave devices.

Example 39 includes the subject matter of example 29, where the enclave device is disposed on a same silicon substrate as the computer memory.

Example 40 includes the subject matter of example 29, further comprising linking between the computer memory and the enclave device.

Example 41 includes the subject matter of example 40, where the linking comprises a system-on-a-chip metal stack linking, a tracing on a circuit board, a package connecting, or a network linking.

Example 42 includes the subject matter of example 29, where the secure device address map comprises a look-up table.

As used in this application, the terms "system" and "component" are intended to refer to a hardware and/or software device in which digital processing is carried out, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). One or more components can reside within a process and/or thread of execution, and a component may be localized on one device and/or distributed between two or more devices. Further, components may be communicatively coupled to each other by various types of communications media to coordinate operations.

It should also be noted that embodiments may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. An apparatus for secure enclave device memory access comprising:
   a computer processor;
   computer memory comprising computer instructions executable by the computer processor, the computer memory further comprising an enclave to execute trusted computer instructions using the computer processor and comprising an enclave device virtual address region;
   a register filter component comprising a base register and a device mask register, the base register configured to store a base memory address of the enclave and the device mask register configured to store a size of the enclave device virtual address region, wherein, the computer instructions when executed by the computer processor cause the computer processor to:
      identify a device enclave mode bit assigned to the enclave device and transmitted with a direct-memory access (DMA) transaction associated with an enclave device,
      map a memory address from a physical address to an enclave device virtual address in the enclave device virtual address region based in part on the DMA transaction;
      grant the enclave device access to the enclave device virtual address region,
      configure the base register and the device mask register to configure a secure device address map associated with the device enclave mode bit to allow the enclave device access to the enclave device virtual address region when the DMA transaction falls within a memory address allowed by the secure device address map.

2. The apparatus of claim 1, the enclave further comprising an enclave non-device virtual address region in communication with the enclave device virtual address region.

3. The apparatus of claim 1, the secure device address map stored in an enclave control structure associated with the enclave.

4. The apparatus of claim 1, the direct-memory access transaction comprising a memory-mapped input-output transaction.

5. The apparatus of claim 1, the computer instructions when executed by the computer processor cause the computer processor to configure the secure device address map using a software-guard extension instruction.

6. The apparatus of claim 5, the software-guard extension instruction comprising an EENTER, EERESUME, EEXIT, or AEX instruction.

7. The apparatus of claim 1, the computer instructions when executed by the computer processor cause the computer processor to configure the secure device address map to map addresses for the enclave device.

8. The apparatus of claim 1, the secure device address map stored in the enclave device virtual address region.

9. A computer-implemented method for secure enclave device memory access comprising:
   identifying, by a processor, a device enclave mode bit assigned to an enclave device and transmitted with a direct-memory access (DMA) transaction associated with the enclave device and an enclave comprising an enclave device virtual address region;
   mapping, by the processor, a memory address from a physical address to an enclave device virtual address in the enclave device virtual address region based in part on the DMA transaction;
   granting the enclave device access to the enclave device virtual address region;
   configuring a base register and a device mask register to configure a secure device address map associated with the device enclave mode bit to allow the enclave device access to the enclave device virtual address region when the DMA transaction falls within a memory address allowed by the secure device address map, the base registered configured for storing a base memory address of the enclave and the device mask register configured for storing a size of the enclave device virtual address region; and
   transmitting data from the enclave device to an enclave device virtual address region associated with the enclave or from the enclave device virtual address region associated with the enclave to the enclave device.

10. The computer-implemented method of claim 9, the enclave device virtual address region communicating with an enclave non-device virtual address region.

11. The computer-implemented method of claim 9, further comprising storing the secure device address map in an enclave control structure associated with the enclave.

12. The computer-implemented method of claim 9, the direct-memory access transaction comprising a memory-mapped input-output transaction.

13. The computer-implemented method of claim 9, further comprising configuring the secure device address map using a software-guard extension instruction.

14. The computer-implemented method of claim 13, the software-guard extension instruction comprising an EENTER, EERESUME, EEXIT, or AEX instruction.

15. The computer-implemented method of claim 9, further comprising configuring the secure device address map to map addresses for the enclave device.

16. The computer-implemented method of claim 9, further comprising storing the secure device address map in the enclave device virtual address region.

17. A non-transitory machine-readable storage medium comprising instructions that, when executed by a processing device, cause the processing device to:
   identify, by a processor, a device enclave mode bit assigned to an enclave device and transmitted with a direct-memory access (DMA) transaction associated with the enclave device and an enclave comprising an enclave device virtual address region;
   map, by the processor, a memory address from a physical address to an enclave device virtual address in the enclave device virtual address region based in part on the DMA transaction;
   grant the enclave device access to the enclave device virtual address region;
   configure a base register and a device mask register to configure a secure device address map associated with the device enclave mode bit to allow the enclave device access to the enclave device virtual address region when the DMA transaction falls within a memory address allowed by the secure device address map, the base registered configured for storing a base memory address of the enclave and the device mask register configured for storing a size of the enclave device virtual address region; and
   transmit data from the enclave device to an enclave device virtual address region associated with the enclave or from the enclave device virtual address region associated with the enclave to the enclave device.

18. The non-transitory machine-readable storage medium of claim 17, the enclave device virtual address region configured to communicate with an enclave non-device virtual address region.

19. The non-transitory machine-readable storage medium of claim 17, the instructions to cause the processing device to store the secure device address map in an enclave control structure associated with the enclave.

20. The non-transitory machine-readable storage medium of claim 17, the direct-memory access transaction comprising a memory-mapped input-output transaction.

21. The non-transitory machine-readable storage medium of claim 17, the instructions to cause the processing device to configure the secure device address map via a software-guard extension instruction.

22. The non-transitory machine-readable storage medium of claim 21, the software-guard extension instruction comprising an EENTER, EERESUME, EEXIT, or AEX instruction.

23. The non-transitory machine-readable storage medium of claim 17, the instructions to cause the processing device to configure the secure device address map to map addresses for the enclave device.

24. The non-transitory machine-readable storage medium of claim 17, the instructions to cause the processing device to store the secure device address map in the enclave device virtual address region.

* * * * *